United States Patent [19]
Jung

US005697124A

[11] Patent Number: 5,697,124
[45] Date of Patent: Dec. 16, 1997

[54] HINGE MECHANISM FOR FOLDABLE ELECTRONIC APPARATUS

[75] Inventor: Jong-Gab Jung, Hwaseong-gun, Rep. of Korea

[73] Assignee: Sam Sung Electronics Co., Ltd, Kyungki-do, Rep. of Korea

[21] Appl. No.: 708,985

[22] Filed: Sep. 6, 1996

[30] Foreign Application Priority Data

Sep. 19, 1995 [KR] Rep. of Korea ............... 25322/1995
Apr. 24, 1996 [KR] Rep. of Korea ............... 9131/1996

[51] Int. Cl.$^6$ .................................................. E05C 17/64
[52] U.S. Cl. ............................................ 16/341; 379/428
[58] Field of Search ........................... 16/341, 344, 329, 16/303, 328, 330; 379/428, 433

[56] References Cited

U.S. PATENT DOCUMENTS

| | | |
|---|---|---|
| 514,890 | 2/1894 | Heilmann . |
| 2,146,391 | 2/1939 | Anderson . |
| 3,026,559 | 3/1962 | Benham . |
| 3,353,206 | 11/1967 | Kerman . |
| 3,518,716 | 7/1970 | Larson . |
| 4,897,873 | 1/1990 | Beutler et al. . |
| 5,031,270 | 7/1991 | Lee ............................ 16/341 |
| 5,109,572 | 5/1992 | Park ........................... 16/341 |
| 5,111,503 | 5/1992 | Takagi . |
| 5,125,131 | 6/1992 | Leblanc . |
| 5,185,790 | 2/1993 | Mischneko . |
| 5,274,882 | 1/1994 | Persson . |
| 5,303,291 | 4/1994 | Takagi et al. . |
| 5,317,785 | 6/1994 | Kobayashi . |

*Primary Examiner*—Chuck Y. Mah
*Attorney, Agent, or Firm*—Robert E. Bushnell, Esq.

[57] ABSTRACT

A hinge mechanism of a button cover of an electronic apparatus includes a pair of modules installed adjacent each other in respective receiving spaces of a case body. Each module includes: a hinge housing; a hinge shaft having a shaft on a first end thereof and a protrusion on a second end thereof and being inserted into the hinge housing so that said first end is disposed outward; a cam hinge having an indent and a protrusion on the same one end thereof so that the protrusion is engaged with the indent; a hinge cover having a hooking protrusion to be coupled to the hinge housing; and a coil spring installed between the cam hinge and the hinge cover. The shaft is coupled to the button cover so that the cover is opened and shut by the action of the pair of modules.

16 Claims, 7 Drawing Sheets

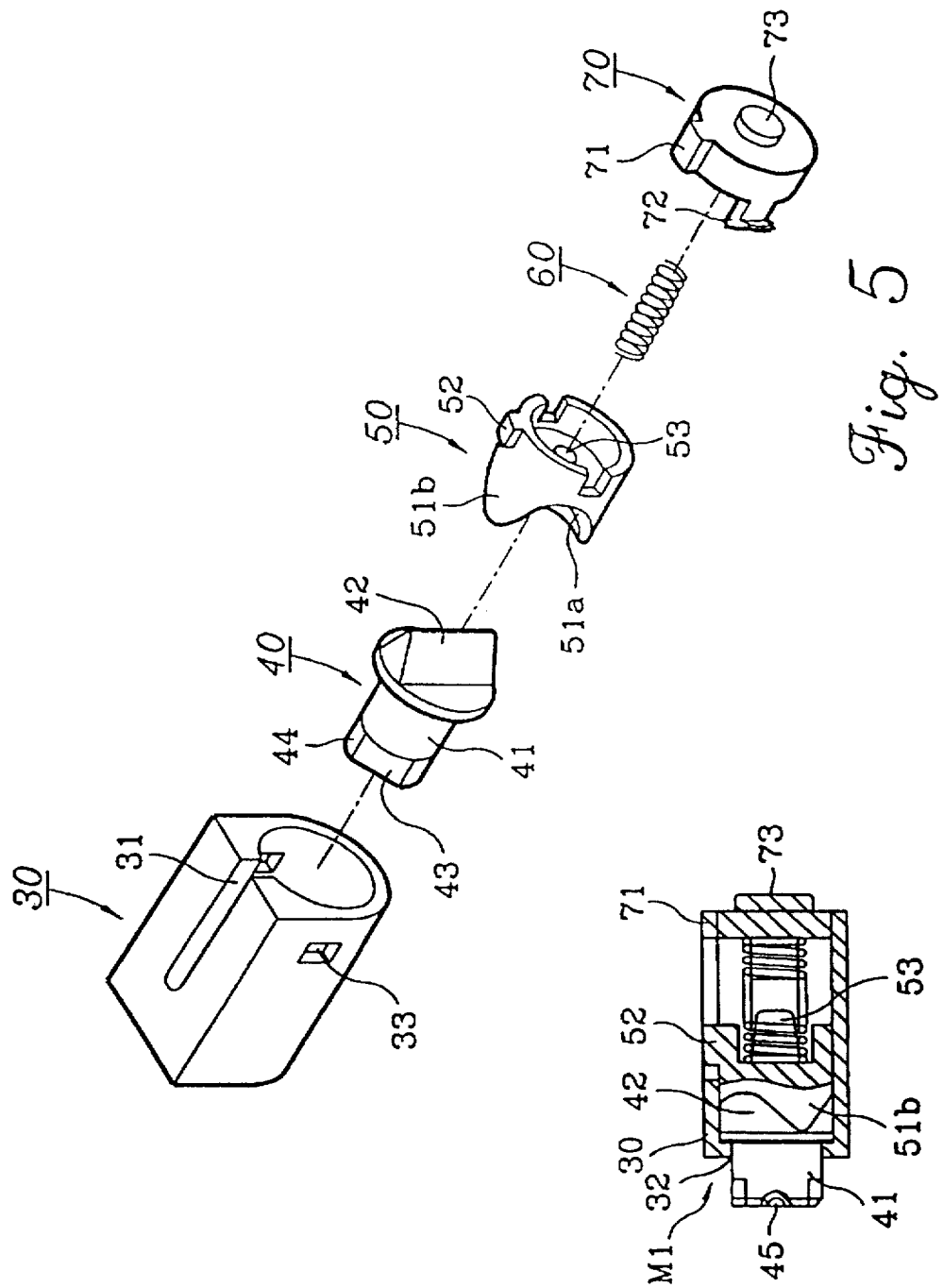

HINGE MECHANISM FOR FOLDABLE ELECTRONIC APPARATUS

CLAIM FOR PRIORITY

This application makes reference to, incorporates the same herein, and claims all benefits accruing under 35 U.S.C §119 from an application entitled *BUTTON COVER OPENING/SHUTTING DEVICE IN PORTABLE CELLULAR PHONE* earlier filed in the Korean Industrial Property Office on 19 Sep. 1995 and 24 Apr. 1996, and there duly assigned Ser. Nos. 25322/1995 and 9131/1996 respectively by that Office.

BACKGROUND OF THE INVENTION

Field of the Invention

The present invention relates to a hinge apparatus for a foldable electronic apparatus, and more particularly, to a hinge mechanism for a button cover of a portable cellular phone which enables one to open and shut the cover thereof by rotatably coupling the button cover with the phone body.

Description of the Related Art

In a portable cellular phone, since dial button keys and function button keys are disposed on a surface of a body thereof, the buttons can be inadvertently pressed when the phone is carried by a user. To prevent such a malfunction, a button cover, or a flip-cover, is frequently provided to protect the phone body. As the length of the cellular phone is shortened, the transmitting sensitivity is lowered due to loss of transmitted sound volume during calling. Such problems can be overcome by using the button cover to reflect the transmitted sound and thereby improve the quality of the transmission.

In a conventional portable cellular phone having a button cover, two hinge pins and a coil spring positioned therebetween are disposed in a cylindrical hinge arm. The hinge pins, which are made of plastic, have cam surfaces on their outer ends. Metal cam followers are fitted to either side of the phone body do as to respectively contact the cam surfaces of the two hinge pins. The cam surfaces have indented portions and protrusions which interact with the cam followers so that the hinge mechanism either keeps the button cover closed or allows the button cover to remain in a stable and open position at a predetermine angle with respect to the phone body. I have noticed however, that when a user repeatedly opens and shuts the button cover, the cam surfaces of the hinge pins wear out due to the friction between the plastic surfaces of the hinge pins and the metal surfaces of the cam followers. I have also found that when a user applies an excessive force to the button cover, the cover may be detached from the body and the hinge assembly elements are often expelled and lost due to the force of the coil spring. Furthermore, cracks may occur in either the hinge assembly or in the body of the phone due to the excessive force applied to the cover.

Takagi, et al., U.S. Pat. No. 5,111,503, endeavors to provide a *Portable Telephone Set* with one cover in an effort to eliminate many of the problems noted above. The hinge of Takagi et al is somewhat cumbersome to manufacture and assemble, and due to its dependence upon a set of U-shaped springs, is not especially reliable for long term use.

Subsequently, Takagi, et al. U.S. Pat. No. 5,303,291 designed a *PORTABLE TELEPHONE HAVING A DETACHABLE FUNCTIONAL MODULE* and Kobayashi, U.S. Pat. No. 5,317,785 designed a *HINGE MECHANISM FOR FOLDABLE ELECTRONIC APPARATUS*; both designs use hinge mechanisms that are not particularly amenable to either disassembly or replacement of broken or worn parts. Moreover, if the distal ends oft he cover serving as hinges become cracked, the entire cover as well as its internal microphone, must be removed and discarded, and a new complete cover installed.

SUMMARY OF THE INVENTION

To solve the above problems, it is an object of the present invention to provide an improved had-held compact telephone.

It is another object to provide a hinge mechanism for a foldable electronic apparatus providing a flip operation structure of a flip-cover coupled with a case body is made in a module and installed at a receiving space and a cam surface and cam follower surface are made of the same material so that the friction therebetween is reduced and performance thereof improves.

It is still another object to provide a hinge mechanism for a button cover in which structural elements are prevented from flying off even when the flip-cover is detached from the case body due to an excessive force applied in opening the flip-cover by using independent flip modules at each receiving space of the case body.

It is yet another object to provide a hinge mechanism of a button cover which can be easily disassembled using a thin pin and then put together and separated when force is forcedly applied, by forming a disassembly groove at a rotation portion of the flip-cover in the case body and an end portion of a hinge shaft.

It is still yet another object of the present invention to provide a hinge mechanism button cover in which cracks on the flip-cover rotation portion or the case are prevented by forming the disassembly groove for performing a tension function at the flip-cover rotation portion when the flip-cover is detached from the case body due to an excessive force applied in opening the flip-cover.

It is further another object of the present invention to provide a hinge mechanism button cover whose life span is prolonged and whose durability is improved by making the hinge shaft and a cam hinge of the same material.

Accordingly, to achieve the above objects, there is provided a hinge mechanism of button cover of an electronic apparatus which includes a pair of modules installed adjacent each other at respective receiving spaces of a case body. Each module is constructed with: a hinge housing; a hinge shaft having a shaft on a first end thereof and a protrusion at a second end thereof each being inserted into the hinge housing so that said first end is disposed outwardly. A cam has an indent and a protrusion on the same end so that the protrusion is engaged by the indent. A hinge cover having a hooking protrusion couples to the hinge housing, and a coil spring is installed between the cam hinge and the hinge cover. The shaft is coupled to the button cover so that the button cover is opened and shut by the action of the pair of modules.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 is an exploded view showing a flip module constructed as an embodiment of the present invention before being assembled;

FIG. 6 is a cross-sectional view of the flip module constructed as an embodiment of the present invention after being assembled;

DETAILED DESCRIPTION OF THE PREFERRED EMBODIMENT

Figure 1:
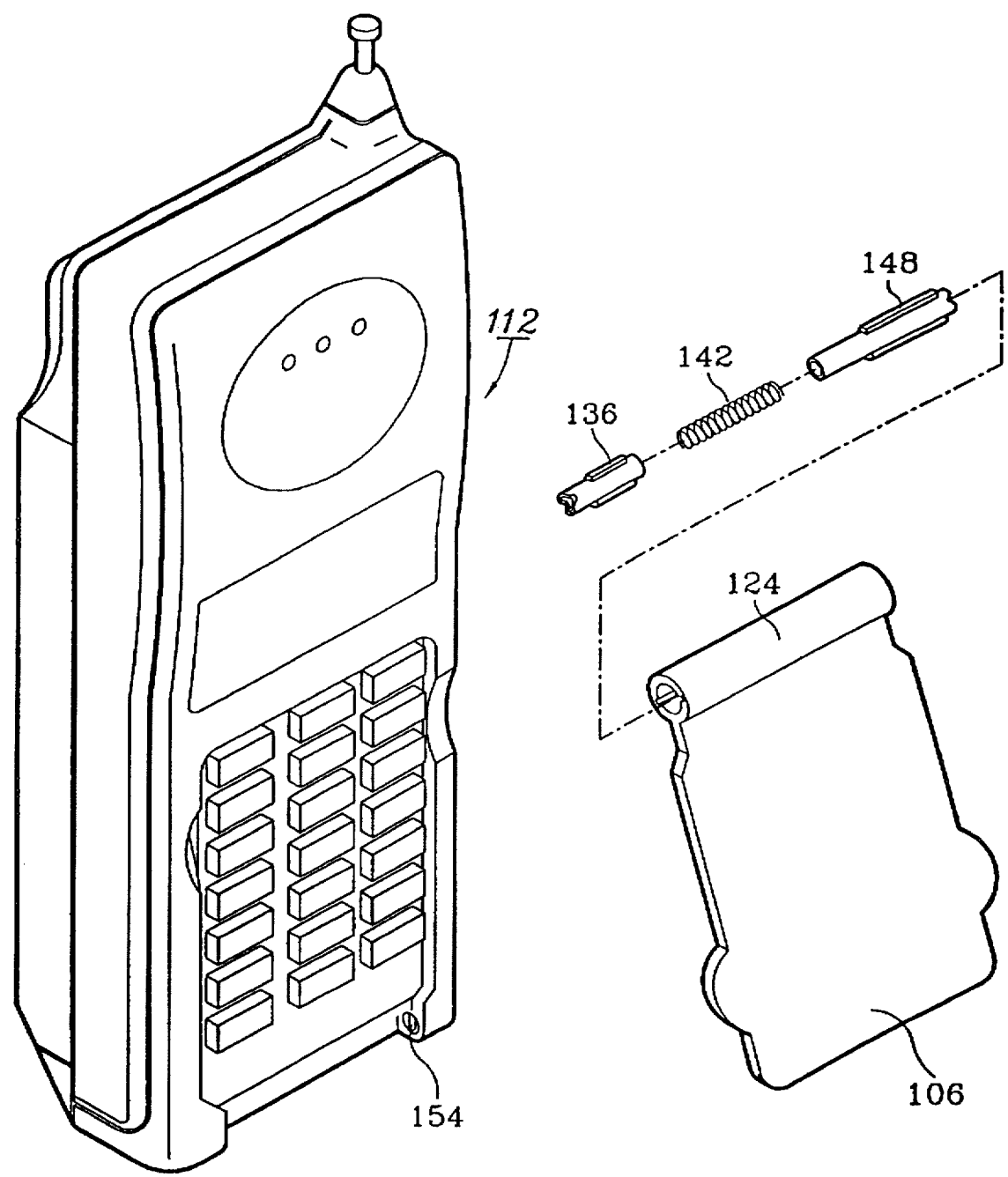
FIG. 1 is an exploded view illustrating a representation of a hypothetical portable cellular phone where a button cover is coupled therewith according to a conventional design practice.

Turning now to the drawings and referring to FIGS. 1, 2A, 2B and 3, the hinge mechanism for a hypothetical button cover in a representation of a hypothetical conventional portable cellular phone will now be described. A conventional hinge assembly is hinge-coupled with a keypad and a cover such as a housing in a cellular phone. The structure of a flip device of a portable cellular phone is as follows.

A hinge assembly for hinge-coupling a flip-cover 106 and a body 112 of a portable wireless phone together forms a pipe-type hinge arm 124 at an end portion of the flip-cover 106. Two individually manufactured hinge pins 136 and 148 and a coil spring 142 disposed between the two hinge pins 136 and 148 are inserted into the pipe-type hinge arm 124. A pin-shaped cam follower 176 formed of metal is fixed to an portion 154 for receiving the hinge pins 136 and 148 in the body 112. The receiving portion is opposingly formed for each hinge pin.

Figure 2A:
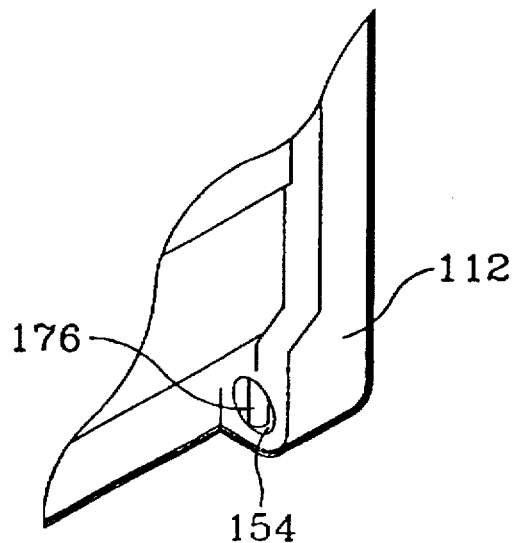
FIG. 2A is a perspective view illustrating a cam of a case body of the representation of a hypothetical portable cellular phone according to the conventional design practice.
Figure 2B:
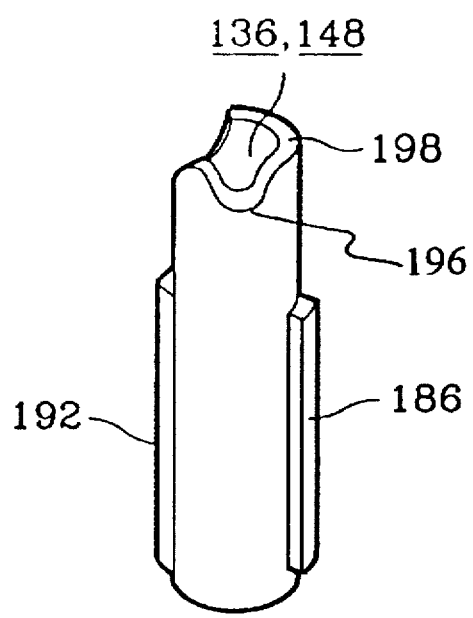
FIG. 2B is a perspective view illustrating a hinge pin of the representation of a hypothetical portable cellular phone according to the conventional design practice.

The coil spring 142 is inserted to elastically function between the hinge pins 136 and 148. As shown in FIGS. 2A-2B, the cam follower 176 is fixed to a housing such that a cam surface of the hinge pins 136 and 148 can surface-contact the cam follower 176. At one end of each hinge pin 136 and 148, a protrusion 198 and an indent 196 are formed and key members 186 and 192 protrude in a lengthwise direction at the outer circumferential surface of each of the hinge pins 136 and 148. Key slots 130 are formed opposingly at the inner circumferential surface of the hinge arm 124 so that the key members 186 and 192 can move together in a horizontal direction.

Figure 3:
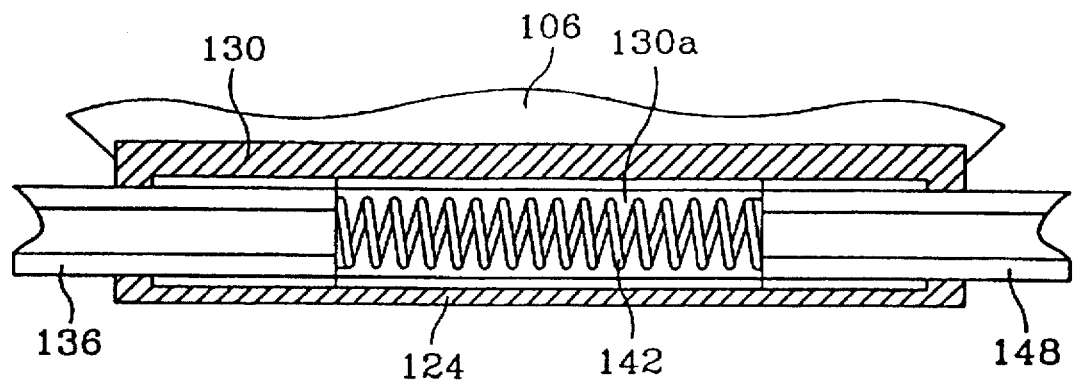
FIG. 3 is a cross-sectional view showing a state of operation for a representation of a hypothetical portable cellular telephone constructed according to conventional design practice.
Figure 4:
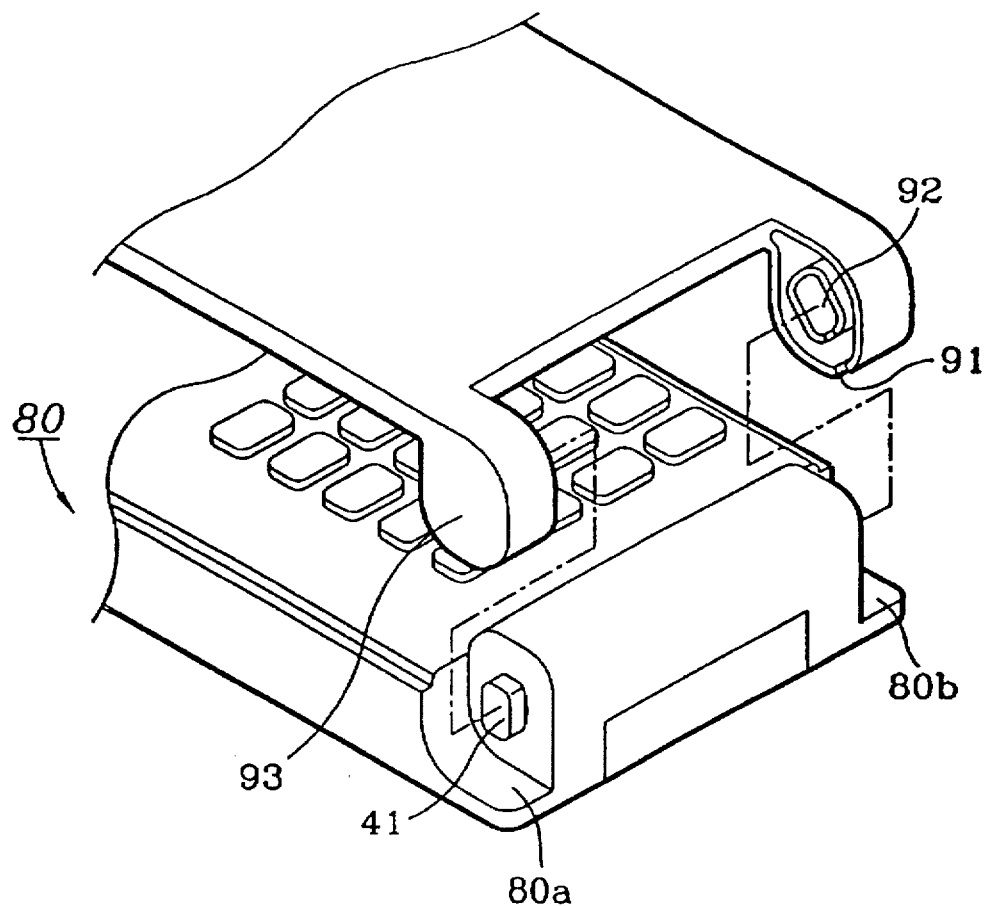
FIG. 4 is an exploded view illustrating a state where a button cover is assembled into the body of a case for a cellular telephone as an embodiment of the present invention.

As shown in FIG. 3, when the flip-cover 106 is rotated by a user by applying a predetermined force to make a phone call, a cam surface of each hinge pin 136 and 148 contacts the cam follower 176 being engaged with each other due to an elastic force of the coil spring 142 during rotating. When there is no rotational moment, the flip-cover 106 is positioned still at either opening or shutting position by the hinge pins 136 and 148 to which the elastic force by the coil spring 142 is applied.

That is, the indent 196 and the protrusion 198 are formed at both ends of the hinge pins 136 and 148, and the key members 186 and 192 are protrude at the outer circumferential surface of each of the hinge pins 136 and 148 so that the key members 186 and 192 can horizontally move along the key slots 130 formed at the inner circumferential surface of the hinge arm 124. Accordingly, the cam surface of the hinge pins 136 and 148 contacts the cam follower 176 so that the opening and shutting positions of the cover 106 are maintained.

However, when a user repeats opening and shutting actions of the flip-cover 106 for communications in a state where the hinge assembly inserted into the hinge arm 124 of the flip-cover 106 is installed in the body 112 of a portable cellular phone, the cam surfaces of the hinge pins wear out due to the friction between members of the heterogeneous material, i.e., the cam surface of the plastic hinge pins 136 and 148 and that of the metal cam follower 176.

Also, when a user applies an excessive force to the cover 106, the flip-cover 106 is detached from the body 112 due to the coil spring 142 so that the hinge assembly elements are often lost. Further, in such a case, cracks occur on the body 112 where the cam follower 176 is formed or both ends of the hinge arm 124. It is cumbersome to change the flip-cover or the entire body of the cellular phone.

The flip modules M1 and M2 installed in a receiving space of a case body 80 are each comprised of a hinge housing 30, a hinge shaft 40 having a shaft 41 at one end thereof and a protrusion 42 at the other end thereof and being inserted into the hinge housing 30, a cam hinge 50 having an indent 51a and a protrusion 51b at the same one end thereof so that the protrusion 42 is engaged with the indent 51a, a hinge cover 70 having a hooking protrusion 72 to be coupled with the hinge housing 30, and a coil spring 60 installed between the cam hinge 50 and the hinge cover 70.

The one side of the hinge housing 30 is a semi-circular surface and the other side thereof is a plane so that both portions are assembled to have a different shape from each other considering the sharing of parts for the left and right sides in view of an assembler and the convenience for assembly.

A guide slit 31 is formed in a lengthwise direction on the upper portion of the hinge housing 30 and hooking grooves 33 are formed on both sides thereof. Also, a hinge opening 32 is formed on the other end thereof.

The hinge shaft 40 inserted into the hinge housing 30 has the shaft 41 and the protrusion 42 respectively at one and the other ends thereof. Plane surface 43 are formed by slicing off each side portion of an end 44 of the shaft 41 so as to form a D-shaped cross-section. The angle made by the plane 43 of the hinge shaft 40 and the protrusion 42 is set considering a communication angle. Also, a disassembly hole 45 is formed at the central surface of the end 44 of the shaft 41 to facilitate the fixing of a thin pin in disassembling the flip module. Further, the length in a lengthwise direction of the plane having both sides cut in a D-shaped cross-section is determined according to the hooking amount when the end portion of the hinge shaft is inserted into the hooking groove of the flip-cover. That is, by adjusting the above hooking amount within 1–2.5 mm, the flip-cover does not easily detached from the case body when assembled and cracks do not occur at around the rotation portion of the flip-cover when the flip-cover is forcedly opened.

The indent 51a is formed at the center portion of one end of the cam hinge 50 so that the sliding surface-contact of the protrusion 42 is possible. Accordingly, the protrusion 51a is formed on each side thereof. At the upper portion of the cam hinge 50, a cam hinge protrusion 52 protrudes so that the cam hinge can be horizontally moved along the guide slit 31 of the hinge housing 30, and a spring fixing protrusion 53 is formed on the other side thereof.

On both sides of the hinge cover 70, there hooking protrusions 72 are provided so as to be hooked by the hooking grooves 33 of the hinge housing 30. At the upper portion of the hinge cover 70, a hinge cover protrusion 71 protrudes so as to be inserted into the guide slit 31 and a fixing protrusion 73 to be installed fast to the receiving space of the case body is formed on the other side thereof. The coil spring 60 installed between the cam hinge 50 and the hinge cover 70 operates elastically with respect to the cam hinge 50 when being completely assembled into the hinge housing 30.

As shown in FIGS. 7 and 8A–8C, to firmly fix the flip modules M1 and M2 to the case body 80, each supporting wall 82 and each fixing wall 83 perpendicular to the supporting wall 82 are formed and an insertion hole 81b to receive the fixing protrusion 73 of the hinge cover 70 is formed in each fixing wall 83. As shown in FIGS. 9A–9D, a hooking opening 92 is formed in the rotation portion 93 of the flip-cover to be coupled with the case body 80.

The shaft 41 of the hinge shaft 40 is inserted into the hinge opening 32 of the hinge housing 30, and then, the hinge shaft 40 is inserted into the hinge housing 30 in a direction of engaging the protrusion 51b and the indent 51a of the cam hinge 50 with the protrusion 42 of the hinge shaft 40. Next, after the coil spring 60 is fixed to the spring fixing protrusion 53, the hooking protrusion 72 is inserted into the hooking groove 33 of the hinge housing 30 by applying a predetermined force while the coil spring 60 is fixed to the fixing protrusion of the hinge cover 70. Thus, the flip modules M1 and M2 are completely assembled.

Figure 7:
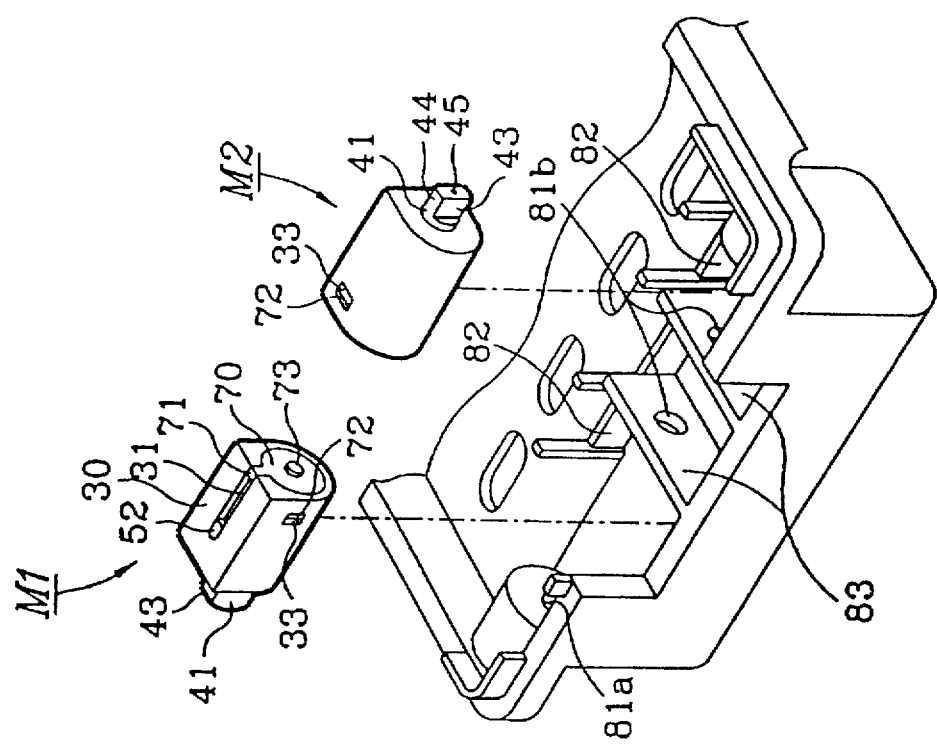
FIG. 7 is a perspective view illustrating a state where each flip module constructed as an embodiment of the present invention is installed a receiving space of the case body.
Figure 8A:
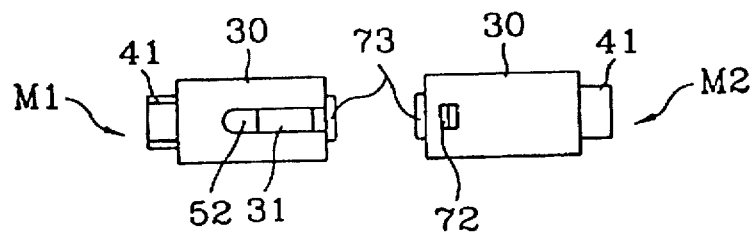
FIGS. 8A and 8C together form a plan view showing a state where the flip module constructed as an embodiment of the present invention is installed the case body.
Figure 8B:
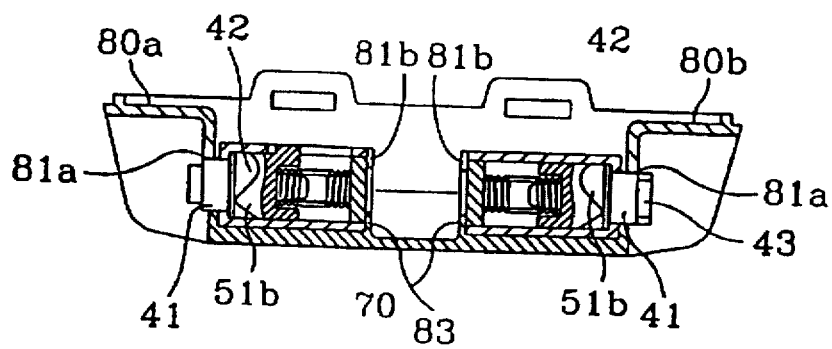
FIG. 8B is a cross-sectional view of the flip module constructed as an embodiment of the present invention being installed the case body.
Figure 8C:
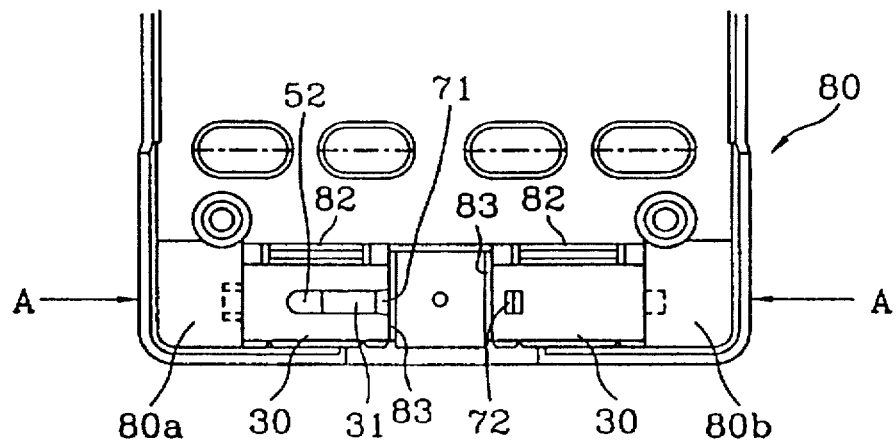
Figure 9A:
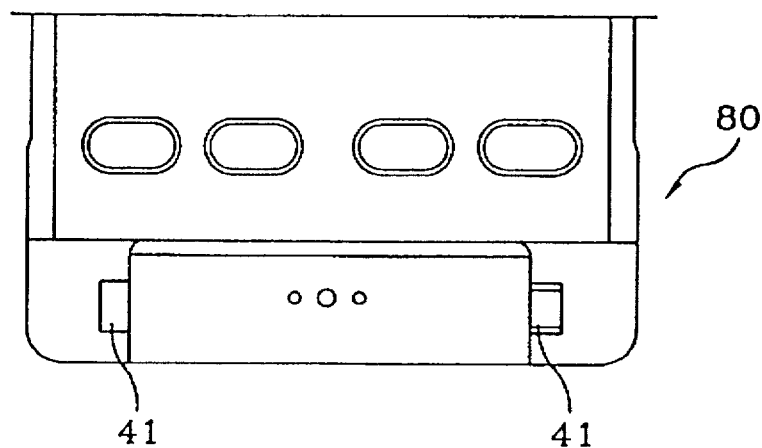
FIG. 9A is a side view of a portable cellular phone showing a state where the flip module constructed as an embodiment of the present invention is installed the case body.
Figure 9B:
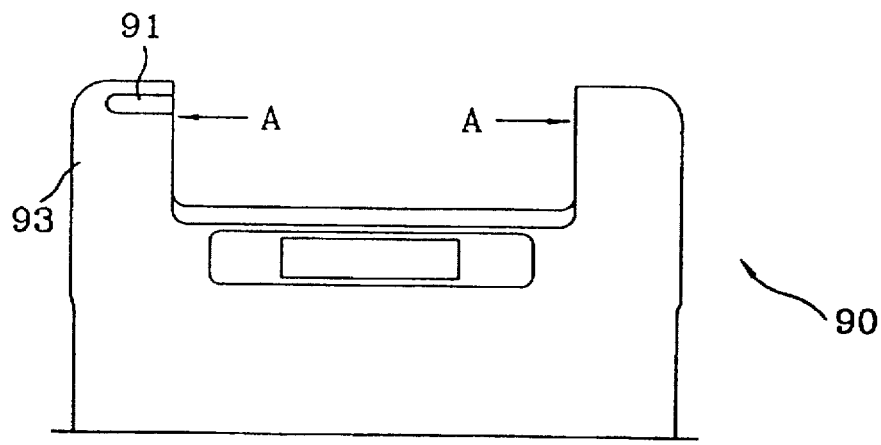
FIGS. 9B through 9D together form a side view illustrating a flip-cover showing details viewed from opposite sides along the directions indicated by arrows A.
Figure 9C:
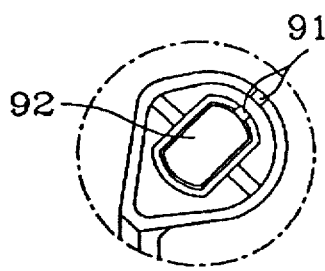
Figure 9D:
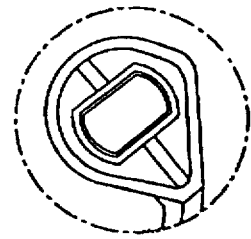

To install the assembled flip modules M1 and M2 in the case body 80, the fixing protrusion 73 of the flip module M1 is first inserted into the insertion hole 81b of the fixing wall 83. Then, the shaft 41 of the flip module is inserted into the hinge opening 32 while being pushed inwardly by a predetermined force. Thus, the flip modules M1 and M2 are installed in the case body 80. In doing so, as shown in FIG. 7, the flip module M1 is installed so as to have the guide slit 31 face upward and the other flip module M2 is installed to have the guide slit 31 face the inside of the case body for the opening and shutting angle of the flip-cover 90. A discussion of the installation of the flip module M2 to the case body after setting the installation angle has been omitted since the installation thereof is the same as that of the flip module M1.

The installation of each flip-cover M1 and M2 at respective receiving space at a rectangular angle is because, since being elastically supported by the coil spring 60, the cam hinge 50 can horizontally move within limit and thus restoring force, occurring when the horizontal moving distance changes according to the phase of the protrusion 51b of the cam hinge 50 directly receiving the restoration force of the spring 60 during the rotation of the hinge shaft 40, i.e., the rotation of the flip-cover 90, provides moment for the rotation of the button cover.

Thus, an opening angle (about 135°) and shutting angle (0°) must be maintained during opening and shutting of the button cover.

In the flip-cover, a disassembly groove 91 is formed at the rotation portion 93 of the flip-cover 90 to prevent cracks of the rotation portion 93 of the flip-cover 90, when the flip-cover 90 installed at the case body 80 receives excessive force by a user to be detached. The flip-cover 90 can be detached from the case body 80 by inserting a thin pin into the disassembly groove 91 and intentionally applying force to the flip-cover 90 over a predetermined angle.

The latter method is utilizing the flexibility of plastic material of the disassembly groove 91, i.e., impact by forcedly applying a force during communication can be absorbed. Thus, when the flip-cover 90 receives a force over a communication angle, both rotation portions 93 of the flip-cover 90 separate wide in an outward direction. Then, if the force is applied continuously, the flip-cover 90 is detached from the case body 80. That is, the end portion of 41 of the shaft 40 inserted into the hooking groove 92 escapes therefrom.

Also, in the former method, by inserting a thin pin into the disassembly groove 91 and pushing the end portion 44 of the hinge shaft 40 in an inward direction, the end portion 44 is detached from the hooking groove 92 of the flip-cover 90 to thereby detach from the case body 80.

After disassembling of the flip-cover 90, the thin pin is inserted into the disassembly hole 45 formed at the hinge shaft 40 and the pin is pushed in the inward direction with a predetermined force. The hinge shaft 40 being elastically supported by the coil spring 60 moves inwardly. Then, when the end portion 41 of the hinge shaft is lifted up, the fixing protrusion 73 of the flip module M1 escapes from the insertion hole 81b of the fixing wall 83 so that the flip module M1 is detached from the receiving space of the case body.

Also, when the disassembly hole 45 of the other flip module M2 is lifted up by the thin pin in the same way, the fixing protrusion 73 of the flip module M2 escapes from the insertion hole 81b of the fixing wall 83 so that the flip module M2 is detached from the receiving space of the case body 80.

As described above, to disassemble the flip modules M1 and M2 being detached from the case body 80, the hooking protrusion 72 of the hinge cover 70 fixed to the hooking groove 33 of the hinge housing 30 is pushed inward and thus the hinge cover 70 is pushed outward by the coil spring 60 installed inside the hinge housing 30.

When the flip-cover 90 is open for communication, the cam hinge 50 contacting the protrusion 42 of the hinge shaft 40 retreats along the slope of the indent 51a to reach the top of the protrusion 51b (the cam hinge of the flip module moves horizontally). Then, the cam hinge 50 slide down along the other slop at the other side. At this stage, the flip-cover 90 stops such action at a point where the protrusion 42 is engaged with the indent 51a of the cam hinge by the restoration force of the coil spring 60 so that an available angle for communication (about 135 °) is maintained.

On the contrary, when the flip-cover 90 is shut, the cam hinge 50 contacting the protrusion 42 of the hinge shaft 40 at the indent 51a slides along the slope of the indent 51a to reach the top of the protrusion 51b. Then, the cam hinge 50 slide down along the other slop at the other side to thereby shut. At this stage, the flip-cover 90 continuously receives further rotatably shutting force by the restoration force of the spring 60 of the flip module.

Since the guide slit 31 is formed at the hinge housing 30 in the flip module and the protrusion is formed at the cam hinge 50, the cam hinge moves horizontally during the rotation of the cover.

As described above, in the button cover opening/shutting device of the present invention, since the independently manufactured flip modules are installed in the receiving space of the case body, the attaching and detaching of the flip-cover and the flip module is easy. Also, by forming the disassembly groove, the disassembly and assembly process is facilitated and cracks on the flip-cover and the loss of parts occurring when the flip-cover is detached can be prevented. Further, by installing the flip modules on both sides of the case body and forming the flip elements of the same material, reduced friction occurs and concurrently the performance thereof improves to thereby provide improved reliability.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A hinge mechanism of a button cover of an electronic apparatus, comprising:
    a pair of modules installed adjacent each other in respective receiving spaces of a case body, each of said modules comprising:
        a hinge housing;
        a hinge shaft having a shaft on a first end thereof and a protrusion on a second end thereof and being inserted into said hinge housing with said first end being disposed outwardly;
        a cam hinge having an indent and a protrusion on the same one end thereof with said hinge shaft protrusion being engaged by the indent;
        a hinge cover having a hooking protrusion to be coupled to said hinge housing; and
        a coil spring installed between said cam hinge and said hinge cover;
        said shaft being coupled to the button cover so that the button cover is opened and shut by the action of said pair of modules.

2. A hinge mechanism of a button cover as claimed in claim 1, further comprised of a guide slit being formed in a lengthwise direction on an upper portion of said hinge housing.

3. A hinge mechanism of a button cover as claimed in claim 2, further comprised of a protrusion, said protrusion being inserted into said guide slit and formed on an upper portion of said cam hinge.

4. A hinge mechanism of a button cover as claimed in claim 1, further comprised of a disassembly groove formed on said first end of said hinge shaft.

5. A hinge mechanism of a button cover of an electronic apparatus, comprising:
    a pair of modules installed adjacent each other in respective receiving spaces of a case body, each of said modules comprising:
        a hinge housing, said housing having a cylindrical shape with a De-shaped cross section;
        a hinge shaft having a shaft on a first end thereof and a protrusion on a second end thereof, said hinge shaft being inserted into said hinge housing with said first end disposed outwardly; said shaft of said hinge shaft having an oval cross-section on an end thereof and said protrusion being wedge shaped;
        a cam hinge having an indent and a protrusion on the same one end thereof with said hinge shaft protrusion being engaged by the indent;
        a hinge cover having an essentially cylindrical shape and having a hooking protrusion to be coupled to an aperture in said hinge housing; and
        a coil spring installed between said cam hinge and said hinge cover;
        said shaft being coupled to the button cover so that the button cover is opened and shut by the action of said pair of modules.

6. A hinge mechanism of a button cover as claimed in claim 5, further comprised of a guide slit being formed in a lengthwise direction on an upper portion of said hinge housing.

7. A hinge mechanism of a button cover as claimed in claim 6, further comprised of a protrusion, said protrusion being inserted into said guide slit and formed on an upper portion of said cam hinge.

8. A hinge mechanism of a button cover as claimed in claim 5, further comprised of a disassembly groove formed on said first end of said hinge shaft.

9. A housing of an electronic apparatus including a hinge mechanism of a button cover, comprising:
    a pair of modules installed adjacent each other in respective receiving spaces of a case body, each of said modules comprising:
        a hinge housing;
        a hinge shaft having a shaft on a first end thereof and a protrusion on a second end thereof and being inserted into said hinge housing with said first end being disposed outwardly;
        a cam hinge having an indent and a protrusion on the same one end thereof with said hinge shaft protrusion being engaged by the indent;
        a hinge cover having a hooking protrusion to be coupled to said hinge housing; and
        a coil spring installed between said cam hinge and said hinge cover;
        said shaft being coupled to the button cover so that the button cover is opened and shut by the action of said pair of modules.

10. A housing of an electronic apparatus including a hinge mechanism of a button cover as claimed in claim 9, further comprised of said modules being installed symmetrically along an axis of rotation of the hinge mechanism in their respective receiving spaces of said case body so as to have identical shutting and opening angles.

11. A housing of an electronic apparatus including a hinge mechanism of a button cover as claimed in claim 9, further comprised of a disassembly hole formed on one side of a rotation portion of said button cover.

12. A housing of an electronic apparatus including a hinge mechanism of a button cover, comprising:
    a pair of modules installed adjacent each other in respective receiving spaces of a case body, each of said modules comprising:

a hinge housing, said housing having a cylindrical shape with a De-shaped cross section;

a hinge shaft having a shaft on a first end thereof and a protrusion on a second end thereof, said hinge shaft being inserted into said hinge housing with said first end disposed outwardly; said shaft of said hinge shaft having an oval cross-section on an end thereof and said protrusion being wedge shaped;

a cam hinge having an indent and a protrusion on the same one end thereof with said hinge shaft protrusion being engaged by the indent;

a hinge cover having an essentially cylindrical shape and having a hooking protrusion to be coupled to an aperture in said hinge housing; and a coil spring installed between said cam hinge and said hinge cover;

said shaft being coupled to the button cover so that the button cover is opened and shut by the action of said pair of modules.

13. A housing of an electronic apparatus including a hinge mechanism of a button cover as claimed in claim 12, further comprised of a supporting wall and a fixing wall disposed to fix said pair of modules on respective receiving spaces of said case body, and a protrusion formed on one side of said hinge cover.

14. A housing of an electronic apparatus including a hinge mechanism of a button cover as claimed in claim 12, further comprised of said modules being installed symmetrically along an axis of rotation of the hinge mechanism in their respective receiving spaces of said case body so as to have identical shutting and opening angles.

15. A housing of an electronic apparatus including a hinge mechanism of a button cover as claimed in claim 12, further comprised of a disassembly hole formed on one side of a rotation portion of said button cover.

16. A housing of an electronic apparatus including a hinge mechanism of a button cover as claimed in claim 15, further comprised of a supporting wall and a fixing wall disposed to fix said pair of modules on respective receiving spaces of said case body, and a protrusion formed on one side of said hinge cover.

* * * * *